United States Patent Office 3,639,526
Patented Feb. 1, 1972

3,639,526
CHLORINATED VINYL CHLORIDE RESIN COMPOSITIONS
Michihiro Kameishi, Osaka, Japan, assignor to Kanegafuchi Chemical Industry Company Limited, Osaka, Japan
Continuation of application Ser. No. 622,026, Mar. 8, 1967. This application Feb. 17, 1970, Ser. No. 12,897
Claims priority, application Japan, Feb. 22, 1966, 41/10,956; Mar. 4, 1966, 41/13,472
Int. Cl. C08f 29/24; C08d 9/08
U.S. Cl. 260—891
1 Claim

ABSTRACT OF THE DISCLOSURE

Chlorinated vinyl chloride resin compositions comprising chlorinated vinyl chloride resins of at least 61% chlorine content mixed with vinyl chloride resins combined with or in alternation with chlorinated vinyl chloride resins, of less than 61% chlorine; and to which mixture, for other embodiments, rubbery butadiene polymers-vinyl compound interpolymers may be mixed; and methods of preparing the same.

---

Figure 1:
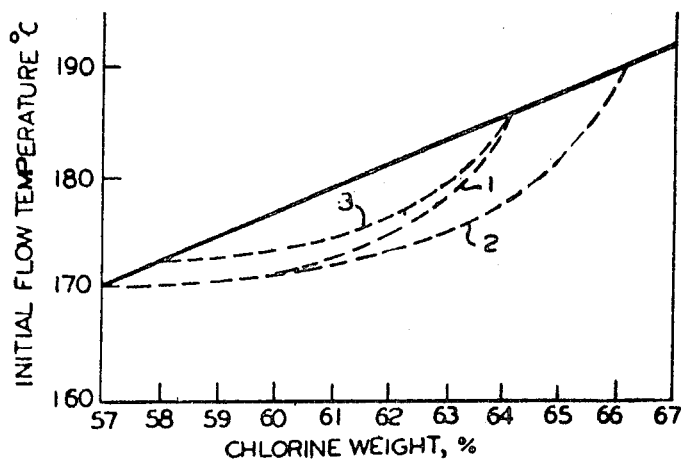

This application is a continuation of S.N. 622,026, filed Mar. 8, 1967, now abandoned.

This invention relates to chlorinated vinyl chloride resin compositions. Its object is to create such compositions which are excellent in impact resistance, and have good processing properties.

Heretofore many methods are known that are useful in improving the productivity, impact strength, weathering resistance and other physical properties of the chlorinated vinyl chloride resins. In the representative methods, organic or polymeric plasticizers are added to the resins, or chlorinated vinyl chloride and other monomers copolymerisable therewith are copolymerized. All these methods are defective. For example, with regard to the intended product, when organic plasticizers (e.g., dioctyl phthalate, dibutylphthalate) are added, its Clash and Berg's softening temperature is substantially decreased, making the addition in large quantity impractical. Therefore, its melt flow index is barely improved. Moreover, this method noticeably deteriorates impact strength and other physical properties, and the plasticizer contained gets out of the reaction system.. When the polymeric plasticizers (for example, nitrile rubber) are added, generally, heat stability and Clash and Berg's softening temperature are substantially reduced, and the manufacturing cost is high. On the other hand, in producing the copolymers, the objective is hardly attainable because of the properties of the comonomers which are not all best suited to this purpose.

Free from such defects as evidenced in the usual arts, the present invention has introduced (1) mixtures of chlorinated vinyl chloride resins of not less than 61% (by weight; the same applies hereinafter) chlorine content with vinyl chloride resins and/or chlorinated vinyl chloride resins of less than 61% chlorine content, and (2) chlorinated vinyl chloride resin compositions made up by homogeneously mixing with these mixtures rubbery butadiene polymers-vinyl compound interpolymers. Details follow:

First, the chlorinated vinyl chloride resins of not less than 61% chlorine content are formed by chlorinating the vinyl chloride resins. The said vinyl chloride resins are the homopolymer of vinyl chloride or its copolymers with comonomers polymerizable therewith with the former predominating the latter in amount. Such comonomers include vinyl acetate, methyl methacrylate, styrene, vinyl ether, etc. The vinyl chloride resins with less than 3000 polymerization degree are adaptable, 2000~300 being especially suitable. Any of the following methods is acceptable for their chlorination, the gas phase method, the liquid phase method, or the suspension method, or other similar methods.

The vinyl chloride resin and/or the chlorinated vinyl chloride resins of less than 61% chlorine content are of 800 to 200 polymerization degree as measured in accordance with JIS (Japanese Industrial Standard)–K6721. The said vinyl chloride resins are the homopolymer of vinyl chloride or its copolymers with comonomers polymerizable therewith, with the former predominating the latter in amount. Such comonomers include vinyl acetate, methyl methacrylate, styrene, vinyl ether, etc. The chlorinated vinyl chloride resins of less than 61% chlorine content are formed by chlorinating the said vinyl chloride resins. The methods of chlorination are the same in case of chlorinating the chlorinated vinyl chloride resin of not less than 61% chlorine content.

The interpolymers include, for example, the three component system tripolymers of styrene-acrylonitrile-butadiene or mixtures containing these three components (abbreviated hereinafter as ABS), or the three component system tripolymers of styrene-methyl methacrylate-butadiene (abbreviated as MBS) or the four component system polymers of styrene-acrylonitrile-methyl methacrylate-butadiene or mixtures containing these four components in predominant amounts (hereinafter abbreviated as MABS). No special limitations are placed on the choice among ABS, MBS and MABS, being the rubbery butadiene polymers-vinyl compounds interpolymers. However, in the case of ABS, desirable are the compositions falling within the range of approximately 45~25:25~20:30~50 in the molecular ratio of styrene:acrylonitrile:butadiene.

In the case of MBS, approximately 40~25:35~20:30~50 in the molecular ratio of styrene:methyl methacrylate:butadiene are desirable.

In the case of MABS, compositions falling within the range of approximately 45~20:25~10:30~10:30~50 in the molecular ratio of styrene:acrylonitrile:methyl methacrylate:butadiene are desirable.

The intended products are obtained by homogeneously mixing in arbitrary proportions the vinyl chloride resins and/or the chlorinated vinyl chloride resins of less than 61% chlorine content with the chlorinated vinyl chloride resins of not less than 61% chlorine content. The proportions of the chlorinated vinyl chloride resins being 95~50% and the vinyl chloride resins being the balance are especially suitable to this purpose.

On the other hand, the mixing proportion of the aforementioned vinyl chloride resin and/or the chlorinated vinyl chloride resins of less than 61% chlorine content, the chlorinated vinyl chloride resins of not less than 61% chlorine content, and the interpolymers, may be arbitrarily chosen. However, desirable are the chlorinated vinyl chloride resins of not less than 61% chlorine content 90~50%, the vinyl chloride resins and/or the chlorinated vinyl chloride resins of less than 61% chlorine content 5~47%, and the afore-mentioned reinforcing modifier 3~30%. Ordinary methods of mixing are applicable. For example, mixing may be done homogeneously into gelation by the use of the Banbury mixer or other blenders. From these compositions, products are easily obtained by ordinary methods, for example, through extrusion, calendering and blow molding.

Below are shown the merits or effects of this invention:

(1) In the intended compositions, the higher the mixing proportion of the chlorinated vinyl chloride resins, the flow temperature greatly decreases, despite the decrease in Clash and Berg's softening temperature is small in comparison with the chlorinated vinyl chloride homopolymers.

On the other hand, the flow temperatures of the intended compositions are always higher than those of the vinyl chloride resins, but the differences between them are small. These two reasons are responsible for the characteristic of the improvements in the processings mentioned above. This characteristic is always obtainable irrespective of the mixing proportion of the chlorinated vinyl chloride resins tie the vinyl chloride resins and/or the chlorinated vinyl chloride resins of less than 61% chlorine content. However, notable value in industrial applications is achieved when the mixing proportion of the chlorinated vinyl chloride resins falls within the range of 90~50%.

These relationships mentioned above are represented in detail in FIG. 1. The real line shows the relationship between the chlorine content (weight percent) of the chlorinated vinyl chloride homopolymers and the initial flow temperature; the broken line 1 shows the relationship between the chlorine content and the initial flow temperature in the mixture composition system of the chlorinated vinyl chloride polymers (chlorine content 64%) and vinyl chloride polymers; the broken line 2 similarly shows the relationship between the chlorine content and the initial flow temperature in the mixture composition system of the chlorinated vinyl chloride polymers (chlorine content 66%) and vinyl chloride polymers; and the broken line 3 shows the relationship between the chlorine content and the initial flow temperature in the mixture composition system of the chlorinated vinyl chloride polymers (chlorine content 58%) and the chlorinated vinyl chloride polymers (chlorine content 64%).

Figure 2:
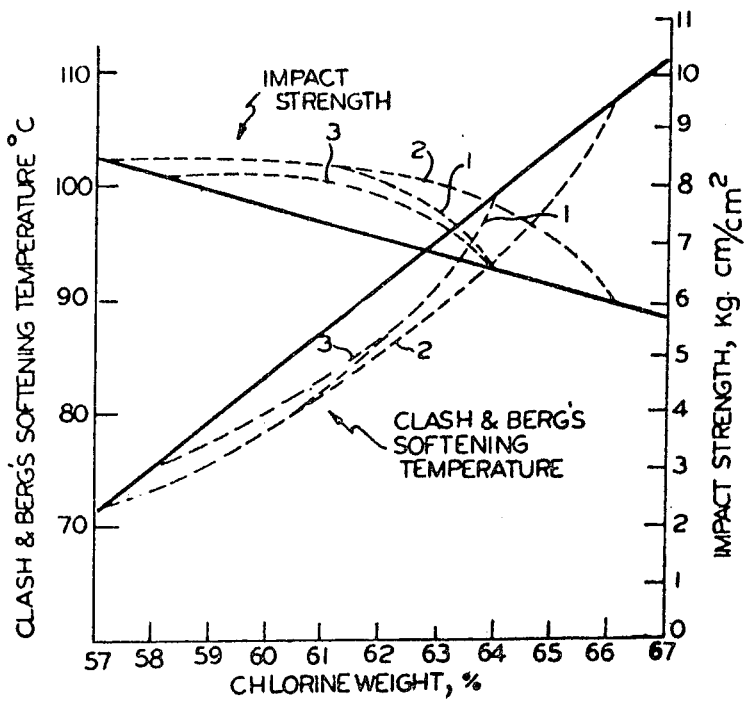

(2) The intended compositions always have higher impact strength as compared with the chlorinated vinyl chloride homopolymers. The impact strength tends to decrease as the chlorine content increases in the compositions while fixing the amount of the rubbery butadiene polymers-vinyl compounds interpolymers. The upper limit to the chlorine content is 70% from the industrial standpoint. Although the lower limit is, of course, the percentage equal to the chlorine content of the vinyl chloride resin compositions, the appropriate figure to meet the objective of this invention will be 57% for the chlorine content of the resin compositions exclusive of the reinforcing modifier, in view of the relationship between the flow temperature and the Clash and Berg's softening temperature. Details with regard to the resin compositions exclusive of the reinforcing modifier are depicted in FIG. 2. In this graph, the real line and the broken lines 1, 2 and 3 correspond respectively to those shown in FIG. 1.

In FIG. 2, the relationships between the chlorine content, the impact strength and the Clash and Berg's softening temperature in these systems are indicated.

As for the mixing proportion of the reinforcing modifier, the greater this proportion, the impact strength is improved. However, mixing of 3~30% is suitable in view of the use to which the products are put, as well as the value in industrial applications.

(3) The intended compositions in which the chlorinated vinyl chloride resins of high chlorine contents and the counterpart vinyl chloride resins and/or the chlorinated vinyl chloride resins of less than 61% chlorine contents are of low average polymerization degrees ($\bar{P}=200\sim800$) or in which the reinforcing modifier is added to the aforementioned resins, show a notable improvement effect, especially in the melt flow index. Although it is possible to serve the end of this invention with compositions consisting of chlorinated vinyl chloride resins of low chlorine contents and vinyl chloride resins of high average polymerization degrees and/or the chlorinated vinyl chloride resins of less than 61% chlorine contents, or with these compositions mixed with the reinforcing modifiers, improvement in the melt flow index is not so notable as in the former ones.

This invention is exemplified in the following examples.

EXAMPLE 1

The mixture compositions of the chlorinated vinyl chloride polymers of various polymerization degrees and chlorine contents and the vinyl chloride polymers of various polymerization degrees were examined in many ways. Several examples are listed in the following table.

The following compositions were subjected to calendering, and the flow condition of the bank was observed (the calender roll used was the 4-roll inverted "L" calender with the roll diameter 8 inch, the roll temperature 180~185° C.).

| Chlorinated vinyl chloride resin | Parts | Vinyl chloride resin | Parts | Condition of the bank | Cl content in the composition (percent) | Clash and Berg's softening temperature |
|---|---|---|---|---|---|---|
| Chlorinated 64%; $\bar{P}=1,000$ | 100 | | 0 | − | 64.0 | 99 |
| Chlorinated 66%; $\bar{P}=1,000$ | 75 | $\bar{P}=800$ | 25 | ++ | 63.7 | 94 |
| Chlorinated 63%; $\bar{P}=1,000$ | 100 | | 0 | − | 63.0 | 95 |
| Chlorinated 66%; $\bar{P}=1,000$ | 75 | $\bar{P}=500$ | 25 | +++ | 63.7 | 93 |
| Chlorinated 66%; $\bar{P}=1,000$ | 87.5 | $\bar{P}=500$ | 12.5 | ++ | 64.9 | 99 |
| Chlorinated 64%; $\bar{P}=1,300$ | 100 | | 0 | −− | 64.0 | 100 |
| Chlorinated 66%; $\bar{P}=1,300$ | 87.5 | Chlorinated 58% | 12.5 | + | 65.0 | 100 |

Note.— +++ = The bank is in very good condition; ++ = The bank is in good condition; + = The bank is normal; − = The bank is a little hard; −− = The bank is very hard.

Composition:                                   Parts
  Resin _____ 100
  Lead stabilizer _____ 5
  Metal soaps _____ 1

NOTE.—Part refers to part by weight (the same applies hereinafter).

This example testifies to the improvement in processing of the resins.

EXAMPLE 2

The following mixture compositions were extruded into sheets:

| Composition 1 | Parts | Composition 2 | Parts | Composition 3 | Parts |
|---|---|---|---|---|---|
| 63% chlorinated vinyl chloride | 100 | 66% chlorinated vinyl chloride | 75 | 66% chlorinated vinyl chloride | 75 |
| Lead stabilizer | 5 | Vinyl chloride ($\bar{P}=800$) | 25 | Vinyl chloride (P=500) | 25 |
| Metal soaps | 2 | Lead stabilizer | 5 | Lead stabilizer | 5 |
| | | Metal soaps | 2 | Metal soaps | 2 |

Blending method: Dry blend method in 75 l. super mixer with stirring for 10 minutes.

Method of extrusion:
65 mm. φ single screw extruder (L/D22, C.R. 3.5). 790 mm φ wide coat hanger type sheet die, screw r.p.m. 30.

Extruding condition and test results:

| | Load current of the motor | Cylinder temperature, °C. | Die temperature, °C. | Extruding condition | Impact strength of the sheet | Clash and Berg's softening temperature, °C. |
|---|---|---|---|---|---|---|
| Composition: | | | | | | |
| 1 | 45A | 180-220 | 210-220 | Flow not good, soon decomposed | Brittle | 95 |
| 2 | 37A | 160-190 | 185-195 | A little initial coloration, but good | Strong | 94 |
| 3 | 35A | 160-185 | 175-185 | Good | do | 93 |

The chlorinated vinyl chloride homopolymers singly used were extruded into sheets with much difficulty, but their mixture compositions with the vinyl chloride polymers were easily extruded into sheets.

The compositions of this invention may be subjected to the injection molding and the pressure laminating.

EXAMPLE 3

The mixture compositions of the chlorinated vinyl chloride polymers of various polymerization degrees and chlorine contents, the chlorinated vinyl chloride polymers of various polymerization degrees, the chlorinated vinyl chloride polymers of less than 61% chlorine contents and the interpolymers (ABS, MBS, MABS) were put to experiments in many ways. Several examples are listed in the following table:

The following compositions were subjected to calendering, and their bank flow condition was examined. The calender roll used was the 4-roll inverted "L" calender with the roll diameter 8 inch, the roll temperature 180~185° C.

The mixture compositions of the chlorinated vinyl chloride resins, the vinyl chloride resins and/or the chlorinated vinyl chloride resins of less than 61% chlorine contents and the rubbery butadiene polymers-vinyl compounds interpolymers showed great improvement in their processing, and moreover, in the impact strength, improvements were evidenced over the chlorinated vinyl chloride resins singly used in which the reinforcing modifiers were mixed.

The intended products, furthermore, tend to be improved notably in processing when vinyl chloride resins and/or chlorinated vinyl chloride resins of less than 61% chlorine content are of low average polymerization degree, ranging from $\bar{P}=200$ to 800.

EXAMPLE 4

The following mixture compositions were extrusion-molded into sheets.

| | Composition | | | | | |
|---|---|---|---|---|---|---|
| | 1 | 2 | 3 | 4 | 5 | 6 |
| 63% chlorinated vinyl chloride resin | 100 | 100 | | | | |
| 66% chlorinated vinyl chloride resin | | | 75 | 75 | 75 | 75 |
| $\bar{P}=800$ vinyl chloride resin | | | 25 | 25 | | |
| $\bar{P}=500$ vinyl chloride resin | | | | | 25 | 25 |
| ABS | | 10 | | | | |
| MBS | | | | 10 | | |
| MABS | | | | | | 15 |
| Lead stabilizer | 5 | 5 | 5 | 5 | 5 | 5 |
| Metal soaps | 2 | 2 | 2 | 2 | 2 | 2 |

Note.—Numerical figures give parts by weight.

| Chlorinated vinyl chloride resin | Parts | Vinyl chloride resin | Parts | Reinforcing modifier | Parts | Condition of the calender bank | Melt flow index, °C. | Clash and Berg's softening temperature, °C. | Impact strength kg.-cm./cm.² |
|---|---|---|---|---|---|---|---|---|---|
| Chlorinated 63%; $\bar{P}=1,000$ | 100 | | | | 0 | − | 183 | 95 | 6.7 |
| Chlorinated 63%; $\bar{P}=1,000$ | 100 | | | ABS | 10 | + | 182 | 92 | 16.0 |
| Chlorinated 66%; $\bar{P}=1,000$ | 75 | $\bar{P}=500$ | 25 | | 0 | +++ | 175 | 93 | 7.5 |
| Chlorinated 66%; $\bar{P}=1,000$ | 75 | $\bar{P}=500$ | 25 | MBS | 10 | +++ | 174 | 92 | 18.5 |
| Chlorinated 64%; $\bar{P}=1,300$ | 100 | | | | 0 | −− | 189 | 101 | 5.3 |
| Chlorinated 64%; $\bar{P}=1,300$ | 100 | | | ABS | 20 | − | 186 | 97 | 17.0 |
| Chlorinated 66%; $\bar{P}=1,300$ | 75 | Chlorinated 58%; $\bar{P}=800$ | 25 | | 0 | ++ | 176 | 94 | 7.7 |
| Chlorinated 66%; $\bar{P}=1,300$ | 75 | Chlorinated 58%; $\bar{P}=800$ | 25 | MABS | 10 | +++ | 173 | 92 | 20.5 |

Note.—Discernment of the condition of the calender bank was visually made. The following ranking system is used to describe the results: +++—Very good; ———Very hard; ++,—Good; ——A little hard; +—Ordinary. Composition: Lead stabilizer—5 parts; Metal soaps—1 part.

ABS used was the one sold under the trade name of Blendex 401. MBS was Kane Act B-12, and MABS used was specifically prepared for this purpose.

Measurement of the melt flow index was carried out by the use of the Koka's flow tester, and the Clash and Berg's softening temperature and the impact strength (Charpy system) were measured in compliance with JIS K-6745.

Blending method: Dry blend method in the 75 l. super mixer with stirring for 10 minutes.

Extrusion method:
65 mmφ single screw extruder (L/D22, C.R. 3.5). 790 mmφ wide coat hanger type sheet die, screw r.p.m. 30.

The extruding condition and the test results:

| | Cylinder temperature, °C. | Die temperature, °C. | Extruding condition | Strength of the sheet, kg.-cm./mm.* | Clash and Berg's softening temperature, °C. |
|---|---|---|---|---|---|
| Composition: | | | | | |
| 1 | 180-220 | 210-220 | Flow no good, soon decomposed | 3 | 95 |
| 2 | 180-220 | 210-220 | do | 15 | 92 |
| 3 | 160-190 | 185-195 | A little initial coloration, but good | 10 | 94 |
| 4 | 160-190 | 185-195 | do | 50 | 92 |
| 5 | 160-185 | 175-185 | Good | 11 | 93 |
| 6 | 160-185 | 175-185 | do | 60 | 91.5 |

*Impact strength measured by falling ball. Ball diamter 1 inch load 1 kg.

With the compositions consisting of the chlorinated vinyl chloride resins and the reinforcing modifiers, sheet extrusion is very difficult, and, for this reason, proper impact strengths may not be obtained. However, conversion to the mixture compositions consisting of the chlorinated vinyl chloride resins, the vinyl chloride resins and the reinforcing modifiers, greatly improved the workability in the sheet extrusion. In this way, improvements were achieved not only in the appearance of sheets, but also in their impact strength.

What is claimed is:
1. Homogeneous blend comprising
   (1) 90 to 50 percent by weight of chlorinated vinyl chloride homopolymer or copolymer with comonomer polymerizable therewith, with chlorine content of not less than 61% chlorine content;
   (2) 5 to 47 percent by weight of (A) chlorinated vinyl chloride homopolymer or copolymer with comonomer polymerizable therewith, with chlorine content of less than 61% chlorine content, (B) vinyl chloride homopolymer or copolymer with comonomer polymerizable therewith, or (C) mixture thereof, said foregoing resins having polymerization degrees of between 200 and 800 according to JIS (Japanese Industrial Standard)–K6721; and
   (3) 3 to 30 percent by weight of interpolymer of methyl methacrylate-acrylonitrile-butadiene-styrene in the respective proportion of 30 to 10, 25 to 10, 30 to 50 and 45 to 20.

References Cited
UNITED STATES PATENTS

| | | | |
|---|---|---|---|
| 3,288,886 | 11/1966 | Himei et al. | 260—876 |
| 3,268,626 | 8/1966 | Jennings et al. | 260—891 |
| 3,341,628 | 9/1967 | Buning et al. | 260—899 |
| 3,364,163 | 1/1968 | Kraemer et al. | 260—899 |
| 3,367,997 | 2/1968 | Smith | 260—899 |

FOREIGN PATENTS

| | | | |
|---|---|---|---|
| 459,514 | 7/1935 | Great Britain | 260—899 |

SAMUEL H. BLECH, Primary Examiner

U.S. Cl. X.R.

260—890